US005732678A

United States Patent [19]

Lindquist et al.

[11] Patent Number: 5,732,678

[45] **Date of Patent: *Mar. 31, 1998**

[54] SLIDE VALVE AND A LARGE TWO-STROKE INTERNAL COMBUSTION ENGINE

[75] Inventors: Henning Lindquist, Nivaå ; Erik Rosenlund Hansen, Vanløse, both of Denmark; Karel Hampejs; Stefan Gabriel, both of Neuhausen am Rheinfall, Switzerland

[73] Assignee: Man B&W Diesel A/S, Copenhagen, Denmark

[ * ] Notice: The term of this patent shall not extend beyond the expiration date of Pat. No. 5,586,526.

[21] Appl. No.: 564,232

[22] PCT Filed: Dec. 2, 1993

[86] PCT No.: PCT/DK93/00400

§ 371 Date: Dec. 4, 1995

§ 102(e) Date: Dec. 4, 1995

[87] PCT Pub. No.: WO94/29578

PCT Pub. Date: Dec. 22, 1994

[30] Foreign Application Priority Data

Jun. 4, 1993 [DK] Denmark ................................ 0646/93

[51] Int. Cl.$^6$ ............................ F01L 9/02; F16K 13/043

[52] U.S. Cl. ................ 123/446; 123/90.12; 137/625.64; 251/905

[58] Field of Search ................................ 123/90.12, 446; 137/625.64; 251/905

[56] References Cited

U.S. PATENT DOCUMENTS

| | | | |
|---|---|---|---|
| 2,597,443 | 5/1952 | Broughton . | |
| 2,953,123 | 9/1960 | Reen et al. | 137/625.64 X |
| 3,709,257 | 1/1973 | Faisandier | 137/625.64 |
| 3,891,145 | 6/1975 | Bartholomäus et al. | 137/625.6 |
| 4,041,983 | 8/1977 | Bianchetta | 137/625.66 X |
| 4,175,589 | 11/1979 | Nakamura et al. | 137/625.64 |
| 4,215,723 | 8/1980 | Ichiryu et al. | 137/625.64 X |
| 4,462,368 | 7/1984 | Funada | 123/446 |
| 4,544,129 | 10/1985 | Ichiryu et al. | 137/625.65 X |
| 5,076,537 | 12/1991 | Mears, Jr. | 251/65 |
| 5,248,123 | 9/1993 | Richeson | 123/90.12 X |
| 5,586,526 | 12/1996 | Lindquist | 123/90.12 |

FOREIGN PATENT DOCUMENTS

| | | |
|---|---|---|
| 0 344 122 | 11/1989 | European Pat. Off. . |
| 570 649A1 | 11/1993 | European Pat. Off. . |
| 32 08 651 A1 | 10/1982 | Germany . |
| 33 45 880 A1 | 6/1984 | Germany . |

(List continued on next page.)

OTHER PUBLICATIONS

IBM Technical Disclosure Bulletin, A.W. Orlando, vol. 6, No. 5, Oct. 1963.

*Primary Examiner*—Gerald A. Michalsky
*Attorney, Agent, or Firm*—Sughrue, Mion, Zinn, Macpeak & Seas, PLLC

[57] ABSTRACT

A spool valve (22) controls a hydraulic drive, such as a drive for a fuel pump (18) in an internal combustion engine, in which the hydraulic drive comprises a driving piston (34) journalled in a hydraulic cylinder (33) which through a flow passage (31) is in communication with the spool valve. The spool (38) may occupy a position in which the flow passage is connected with a high-pressure source (29) and another position in which the flow passage is connected with a low-pressure port (30). The spool is settable by means of a positioning means (23) electrically activated by a control unit (16) which determines intended positions of the spool and for a movable part (56) in the positioning member. The movable part has windings (51) positioned in a magnetic field in a slit (60) which is oblong in the longitudinal direction of the spool. A sensor (66) signalizes the actual position of the movable part to the control unit (16). The movable part and the spool (38) are attached to each other so that the spool valve follows the movements of the movable part (56). The control unit (16) supplies current to the windings if the actual position of the movable part differs from the intended position.

14 Claims, 4 Drawing Sheets

FOREIGN PATENT DOCUMENTS

Figure 1:
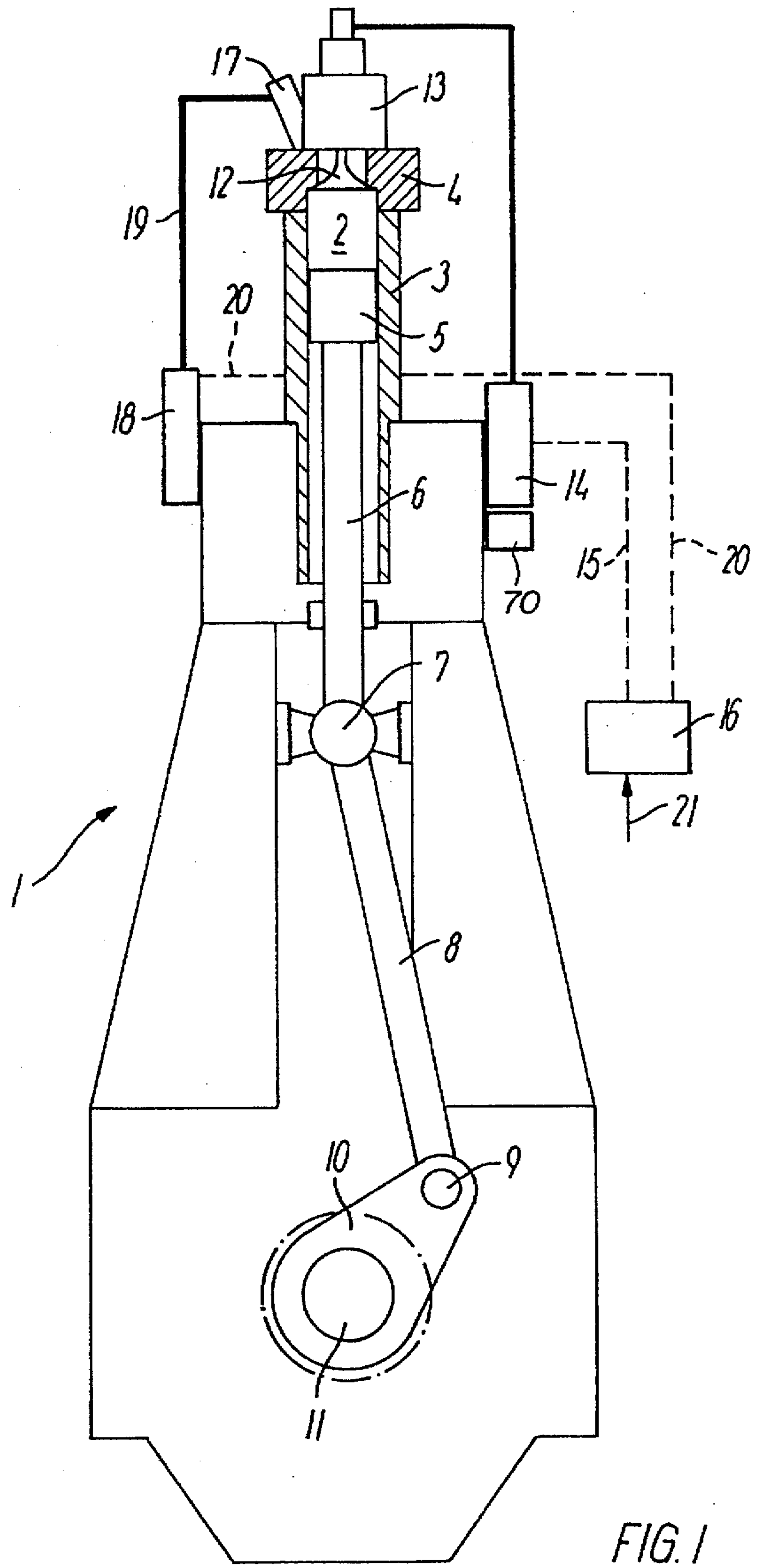

| | | | |
|---|---|---|---|
| 55-10198 | 1/1980 | Japan | 251/905 |
| 56-86281 | 7/1981 | Japan | 137/625.64 |
| 56-143883 | 11/1981 | Japan | 137/625.64 |
| 660 637 A5 | 5/1987 | Switzerland . | |
| 668 463 A5 | 12/1988 | Switzerland . | |
| 2 136 499 | 9/1984 | United Kingdom . | |
| 2 138 969 | 10/1984 | United Kingdom . | |
| 2 256 698 | 12/1992 | United Kingdom . | |

SLIDE VALVE AND A LARGE TWO-STROKE INTERNAL COMBUSTION ENGINE

The invention relates to a spool valve for control of a hydraulic drive, such as a drive for a fuel pump or an exhaust valve of an internal combustion engine, in which the hydraulic drive comprises a driving piston journalled in a hydraulic cylinder which, through a flow passage, is in communication with the spool valve, the spool of which may occupy a position in which the flow passage is connected with a high-pressure source for hydraulic oil, and another position, where the flow passage is connected with a low-pressure port, and in which the spool is positionable by means of a positioning means electrically activated by a control unit, and in which the positioning means has a movable part and a sensor signalizing the actual position of the movable part to the control unit which determines intended positions for the spool and for the movable part.

A spool valve of this kind is known from WO89/03939 but there the movable part is in the axial direction positionally locked to the spool, and consequently the positioning means has to move the whole mass of the spool. The comparatively large forces required to position the spool make it necessary to design the positioning means as a hydraulic linear drive, the piston of which is axially locked to the spool. This drive is slow-acting.

For some years it has been usual for the exhaust valve of large two-stroke internal combustion engines to be activated by a hydraulic drive, the driving piston of which is driven by a camshaft. More recently it has been suggested to replace the camshaft activation of the exhaust valve and/or the fuel pump by a hydraulic drive, the driving piston of which is connected with the piston of the fuel pump or delivers oil to the driving piston of the exhaust valve or is directly connected with the spindle of the exhaust valve. A number of different spool valves are known, in which the position of the driving piston of the drive is fed back to the spool via a rod and thread connection, which is described, for example, in Swiss patents Nos. 660 637 and 668 463. It is typical for this type of spool valves that the spool itself is set by means of a rotating electric motor turning a rod inserted in a thread and being displaced by the turning in the longitudinal direction of the spool, and thus pulling the spool along in the rod movement. As a consequence of the dimension of the rotating masses in the driving motor and in the associated thread-connected rods, these spool valves are relatively slow-acting.

Furthermore a large number of spool valves are known, using solenoid valves as electrically activated positioning means. Upon activation, solenoid valves jump from an extreme position to an opposite extreme position, where there is a relatively short distance between the extreme positions, such as a few millimeters. These valves are suitable as switching valves which keep a pressure line either fully open or fully closed. In these valves, the displacement of the spool is thus determined by the time in which the solenoid valve is open, which causes such spool valves to be relatively slow-acting as well.

Spool valves are also known, in which the spool is controllingly connected with a core material positioned in a coil and being displaceable in the longitudinal direction of the spool by current being passed through the coil. The relatively large mass of the core material causes the setting times for the valve to be impossible to bring down to such low values that secondary pressure control systems are expendable.

To obtain a sufficiently accurate control of hydraulic systems requiring a very well-defined, rapid and accurate control of the pressure on the delivery side of the hydraulic drive, it is thus necessary to use secondary control systems, such as pressure relief valves on the high-pressure side of the drive. Therefore, the known hydraulic systems are often quite complicated in order to obtain a sufficiently accurate control of pressure conditions in the systems.

The object of the invention is to provide a spool valve which is quick-acting and may be set accurately, and at the same time is of a simple design.

This is obtained by the spool valve according to the invention being characterized in that the movable part carries windings positioned in a magnetic field in a slit which is oblong in the longitudinal direction of the spool. The movable part is displaceable in the longitudinal direction of the slit in dependency of the direction and intensity of the current in the windings, that the movable part is connected with a small pilot spool which is axially displaceable with respect to the spool. The spool follows the movements of the pilot spool. The control unit supplies current to the windings, if the actual position of the movable part differs from the intended position.

The positioning means is thus designed as a linear motor with movable windings and with positioning feedback to the control unit. By letting the spool follow the movements of, the movable part with the pilot spool, an unambiguous and well-defined coherence between the control of the positioning means and the control of the hydraulic drive is obtained in a simple manner. From the driving unit of a loudspeaker it is known to use a movable part with windings positioned in a magnetic field in an oblong slit. In the loudspeaker, the windings are fed with an alternating voltage of a frequency which causes a corresponding oscillation frequency in the membrane connected with the movable part. As these oscillation frequencies may get above 20,000 Hz, it is obvious that the movable part may perform even extremely rapid setting movements. By supplying direct current to such a winding-carrying part, the control unit may cause very rapid movements in the part and the associated spool. The maximum travel of the movable part may be freely selected according to need by designing the oblong slit with a larger length than the largest travel desired from the movable part. The movable part only moves when current passes through the windings, and the desired direction, magnitude and speed of the movement may be freely selected by adaptation of the current intensity and the current direction of the windings. The movable part only need to move the small pilot spool, and the movable part may thus rapidly be started and stopped immediately at any desired intermediate position between the extreme positions.

With the positioning means designed as a linear motor, the mass of the positioning means has been made so small that the setting speed is substantially determined by the mass to be moved by the positioning means. This makes it possible to obtain novel high setting speeds for the spool valve by limiting the mass connected to the movable part. This mass is reduced by connecting the movable part with a small pilot spool, the movements of which the spool is adapted to follow. For a spool with a mass of approximately 1 kg, the pilot spool may, for example, be designed with a mass of 10 g, which, for example, makes possible a spool move of 15 mm in 3–4 ms. This by far exceeds the setting speed obtainable so far for relatively large spool valves controlling high-pressure hydraulic drives. The possibility of rapidly opening the spool valve for supply of large amounts of oil, and corresponding rapid resetting of the spool valve for relief of the pressure in the hydraulic cylinder renders possible a very fine control of the pressure on the delivery side of the hydraulic drive, thus making superfluous the previously known pressure relief valves with associated control systems.

By means of the positioning sensor, the control unit may continuously monitor whether the spool is in the desired position. If the spool changes position owing to external influences, the control unit may immediately pass a corrective flash of current through the windings so that the actual position is made to correspond with the intended position.

It is essential for obtaining the rapid movements of the spool, and thus its short setting times intended with the invention, that the windings are positioned on the movable part so that the latter achieves a very low mass.

The current. intensity required for the position setting depends on the strength of the magnetic field in the oblong slit. Preferably, therefore, the side walls of the slit are delimited by an annular magnet and an iron-based material, respectively, as this in a simple manner produces a strong and uniform magnetic field which renders it possible to limit the size of the windings, in order that the already small mass of the movable part is reduced as much as possible, which promotes a rapid setting of the spool valve.

Preferably, the movable part is in controlling connection with the spool via a rod extending coaxially with the spool and upon which the movable part and the pilot spool are mounted. This makes it possible to arrange the positioning means on the outside of the spool valve housing itself, thus facilitating the manufacturing and maintenance of the valve.

The pilot spool functions by controlling control edges for high-pressure and low-pressure oil sources which may affect pressure faces in the spool.

In an embodiment preferred because of its fast-acting character, the valve designed with a pilot spool is characterized in that the pilot spool is positioned inside the spool, preferably coaxially with it, and has two circumferential grooves in its peripheral surface and a flange positioned between the grooves. The two grooves of the pilot spool communicate with the high-pressure source and the low-pressure port, respectively. At its first end the spool has an axially extending bore which communicates with the high-pressure source, and in which a piston supported by the spool housing is displaceably inserted in a tightly fitting manner. At its second end the spool has an axially extending bore in which a piston supported by the spool housing is displaceably inserted in a tightly fitting manner. The bore at the second end of the spool has a conduit extending to the pilot spool and having a mouth which may be barred by the flange of the pilot spool. The bore at the second end of the spool has a larger cross sectional area than the bore at the first end of the spool.

The high-pressure connection to the smallest bore at the first end of the spool causes a permanent force on the spool acting in a direction towards the second end of the spool. If this force displaces the spool in relation to the pilot spool, the conduit mouth is opened at the pilot spool flange to the high-pressure source, so that the pressure in the large bore at the second end of the spool is increased. Thus a force directed towards the first end of the spool increases, so that the spool again occupies a neutral position in relation to the pilot spool, in which position the two oppositely directed forces balance. If the pressure in the large bore becomes too high, the spool is displaced so that the conduit mouth is brought into contact with the low-pressure port, thus relieving the pressure in the large bore to the level of balance. Hence the bore at the second end of the spool has the largest cross sectional area, a displacement of the pilot spool will always cause a corresponding displacement of the spool. The setting speed of the spool in relation to the pilot spool may be freely selected by adapting the mutual cross sectional area between the large and the small bore at either end of the spool. Of course, it is possible to design several axially extending bores with associated pistons at each spool end, when care is taken to give the bores a different total cross sectional area.

The invention also relates to a large two-stroke internal combustion engine, such as a main engine of a ship, having a hydraulically driven cylinder member, particularly, a fuel pump, in which the hydraulic drive of the member comprises a driving piston journalled in a hydraulic cylinder which, through a flow passage, is in communication with a spool valve. The spool of which may occupy a position in which the flow passage is connected with a high pressure source for hydraulic oil, and another position, where the flow passage is connected with a low pressure port. The spool is positionable by means of a positioning means electrically activated by an engine-controlling computer, which determines how the cylinder member is to be activated during an engine cycle and from this determines intended positions for the spool and for a movable part in the positioning means, and in which the positioning means includes a linear drive with a movable part which is displaceable in the longitudinal direction of the spool over a distance corresponding to the distance between the extreme positions of the spool.

As mentioned above, with a linear motor where the mass of the movable part is reduced owing to the part only having to carry the windings, it is possible to obtain very rapid and accurate setting movements, which may extend over any length. Thus, in a simple manner it is possible to let the movable part be displaceable over the same distance as the spool, whereby the design of the spool valve becomes very simple. The possibility provided with such a spool valve for an accurate and extremely rapid control of the oil pressure on the delivery side of the hydraulic drive is particularly advantageous in a diesel engine, where particularly the movements of the fuel pump have to the controlled very accurately to obtain an optimum combustion process in the combustion chamber of the engine. With the invention, it is possible to control the hydraulic drive for the fuel pump, for example without any further secondary measures, for initiation and termination of the fuel injection at exactly the desired moment of the engine cycle and with delivery of an accurately metered amount of oil. The accurate control of the fuel injection renders it possible to reduce the specific fuel oil consumption of the engine, and further, the fuel injection may be divided into a pre-injection and a main injection merely by starting and stopping the hydraulic drive several times during a relatively small angle of rotation of the crankshaft.

The use of a small pilot spool makes it simple to provide a camshaft-activated emergency control which enters into force in case of failure of the electronic system of the engine, as the spool is in that case activated via a rod following the movements of a control cam rotating synchronously with the crankshaft of the engine. The rod may be directly activated by the cam, but it is also possible to use an indirect, hydraulically based emergency control system, as described in Danish patent application No. 647/93 (corresponding to WO94/29577).

Figure 2:
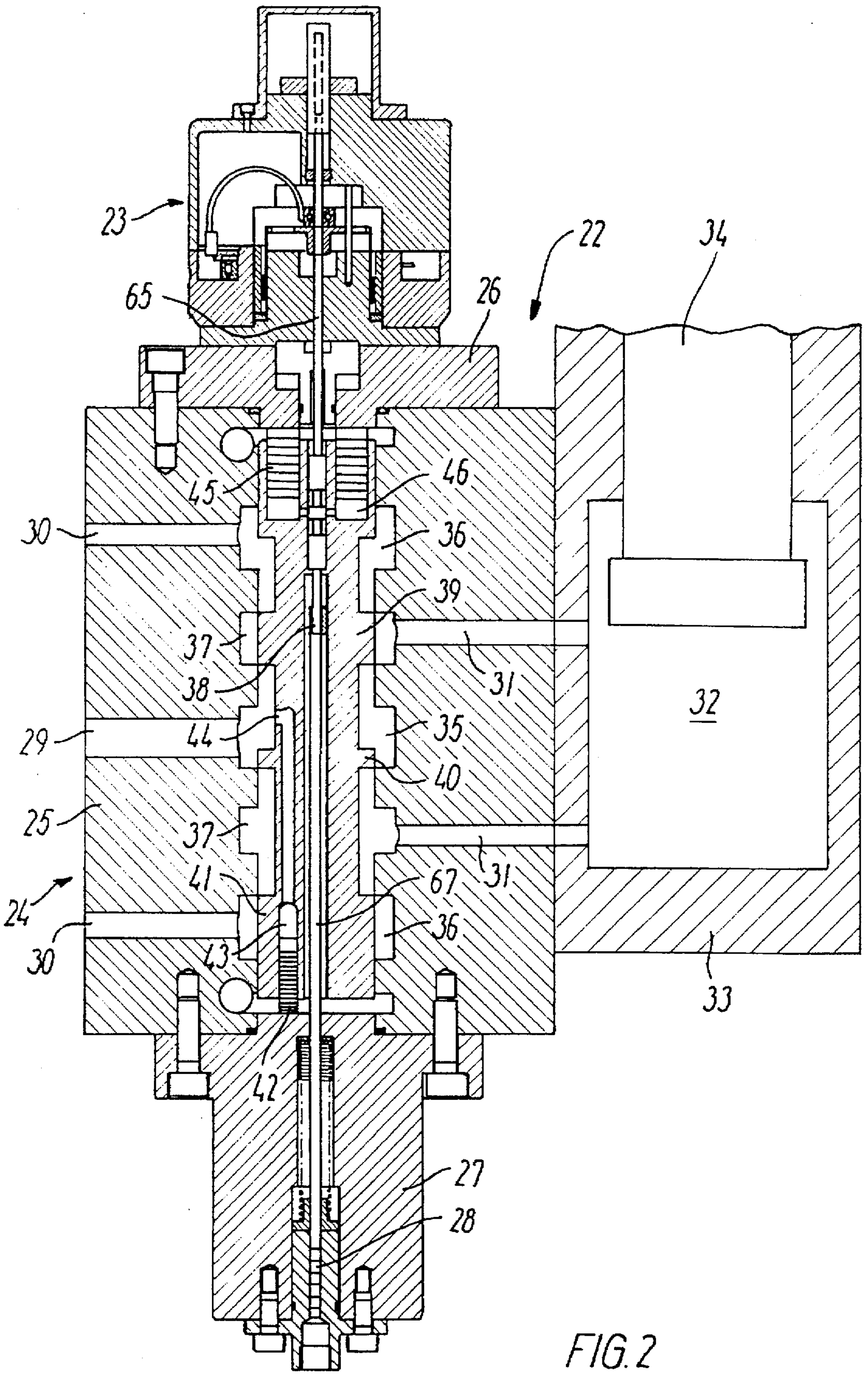

Examples of embodiments of the invention will be described below in further detail with reference to the schematic drawings, in which FIG. 1 is an outline of an internal combustion engine, FIG. 2 is a longitudinal sectional view through a spool valve for a cylinder member, FIG. 3, on a larger scale, is a segment of the spool valve of FIG. 2, FIG. 4, on a larger scale, shows a positioning means for the spool valve of FIG. 2.

FIG. 1 shows a large two-stroke diesel engine of the crosshead type generally designated 1, which may be used as the main engine of a ship or as a stationary power-producing engine. The combustion chamber 2 of the engine is delimited by a cylinder liner 3 and a cylinder cover 4 and a piston 5 journalled in the liner.

Via a piston rod 6, the piston is directly connected with a crosshead 7 which, via a connecting rod 8, is directly connected with a connecting rod pin 9 in a throw 10 of a crankshaft 11. A cylinder member in the form of an exhaust valve 12 with associated housing 13 is mounted on the cover 4. The exhaust valve is activated by a hydraulic drive 14 controlled by an electro-mechanical spool valve activated by control signals transmitted through a wire 15 from a computer 16.

A fuel valve 17 mounted in the cover 4 may supply atomized fuel to the combustion chamber 2. Another cylinder member in the form of a fuel pump 18 is controlled by an electro-mechanical spool valve and may supply fuel to the fuel valve through a pressure line 19 in dependency of control signals received from the computer 16 through a wire 20. Through a signal-transmitting wire 21 the computer 16 is supplied with information on the actual number of revolutions per minute of the engine. The number of revolutions may either be taken from the tachometer of the engine, or it may originate from an angle detector and indicator mounted on the main shaft of the engine and determining the actual angular position and rotating speed of the engine for intervals constituting fractions of an engine cycle of a shaft rotation of 360°. When the computer has determined the time for the fuel injection and the associated amount of fuel, and the opening and closing times of the exhaust valve, the fuel pump 18 and the drive unit 14 are activated accordingly at the moment of the engine cycle which is correct for the cylinder. The engine has several cylinders which are all equipped in the above manner, and the computer 16 may control the normal operation of single or all cylinders.

The oil inflow and outflow for the hydraulic drives of the cylinder members are controlled by a spool valve 22, which during normal engine operation is set by an electrically activated positioning means 23 reacting on control signals from the computer 16.

The housing 24 of the spool valve is manufactured from several pieces bolted together, viz. a central piece 25 and an end cover 26 on which the electrically activated positioning means 23 is mounted, and an end cover 27 comprising a piston 28 which may be activated by a camshaft, if the electronic control of the engine fails.

The central piece of the housing has a fluid inlet conduit 29 communicating with the high-pressure line, which may supply hydraulic oil at a pressure of 300 bar, for example. The central piece of the housing further has two fluid drain conduits 30 communicating with a low-pressure port, and two outlet conduits 31 leading to a pressure chamber 32 in a hydraulic cylinder 33 for the hydraulic drive driving the cylinder member. A hydraulic piston 34 in the drive is driven upwards by the oil pressure in the chamber 32 when the latter is connected with the inlet conduit 29. When the chamber 32 is connected with the drain conduit 30, the piston 34 may be returned to the starting position by means of hydraulic or pneumatic pressure on a piston face, not shown.

The conduit 29 opens out in a circumferential groove 35 which is consequently pressurized. Similarly, the drain conduits 30 communicate with a respective circumferential groove 36, and the outlet conduits 31 communicate with a respective circumferential groove 37. A spool 38 positioned centrally in the housing is shown in its neutral position where a circumferential flange 39 on the spool exactly bars the groove 37 and thus cuts off the outlet conduit 31 topmost on the drawing from both the drain conduit 30 and the inlet conduit 29. Similarly, the bottom outlet conduit 31 is cut off from the inlet conduit 29 by means of another circumferential flange 40 on the spool and is cut off from the drain conduit 30 by means of a third circumferential flange 41 on the spool.

When the spool is moved from its neutral position towards the positioning means 23, the inlet conduit 29 is put into connection with the two outlet conduits 31, and when the spool is moved from its starting position towards the end cover 27, the drain conduits 30 are put into connection with the two outlet conduits 31.

Two piston members 42, of which only one is shown in the drawing, abut on the end cover 27 and project into a respective axially extending bore 43 in the second end of the spool positioned at the end cover 27. Through a pressure conduit 44, bores 43 communicate continuously with the inlet conduit 29. Two piston members 45 at the opposite first end of the spool abuts the end cover 26 and projects into axially extending bores 46. The piston members 45 and the associated bores 46 have a substantially larger diameter than the piston members 42 and their associated bores 43, for example so that the ratio between the areas of the bores is 2:1.

Figure 3:
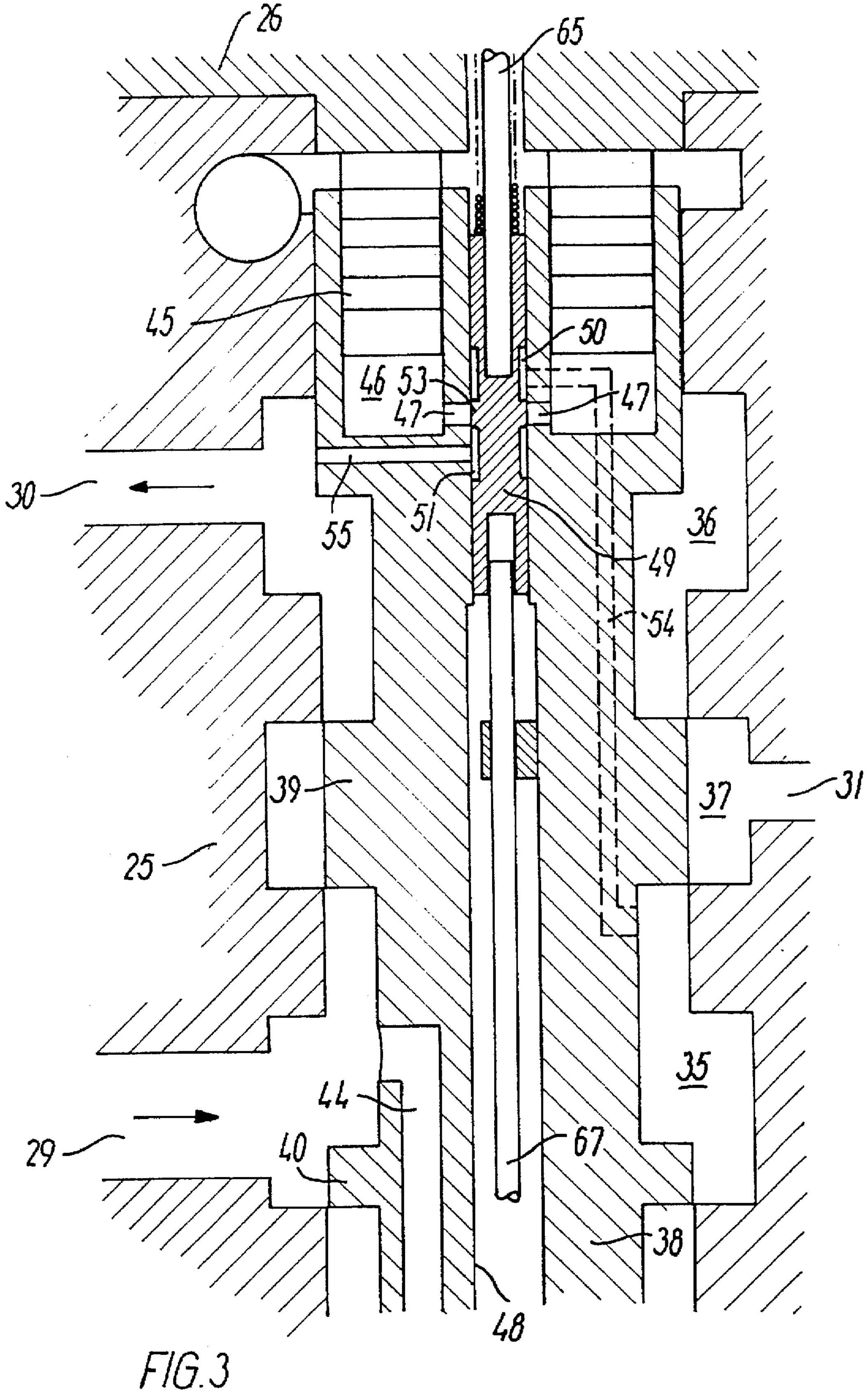
Figure 4:
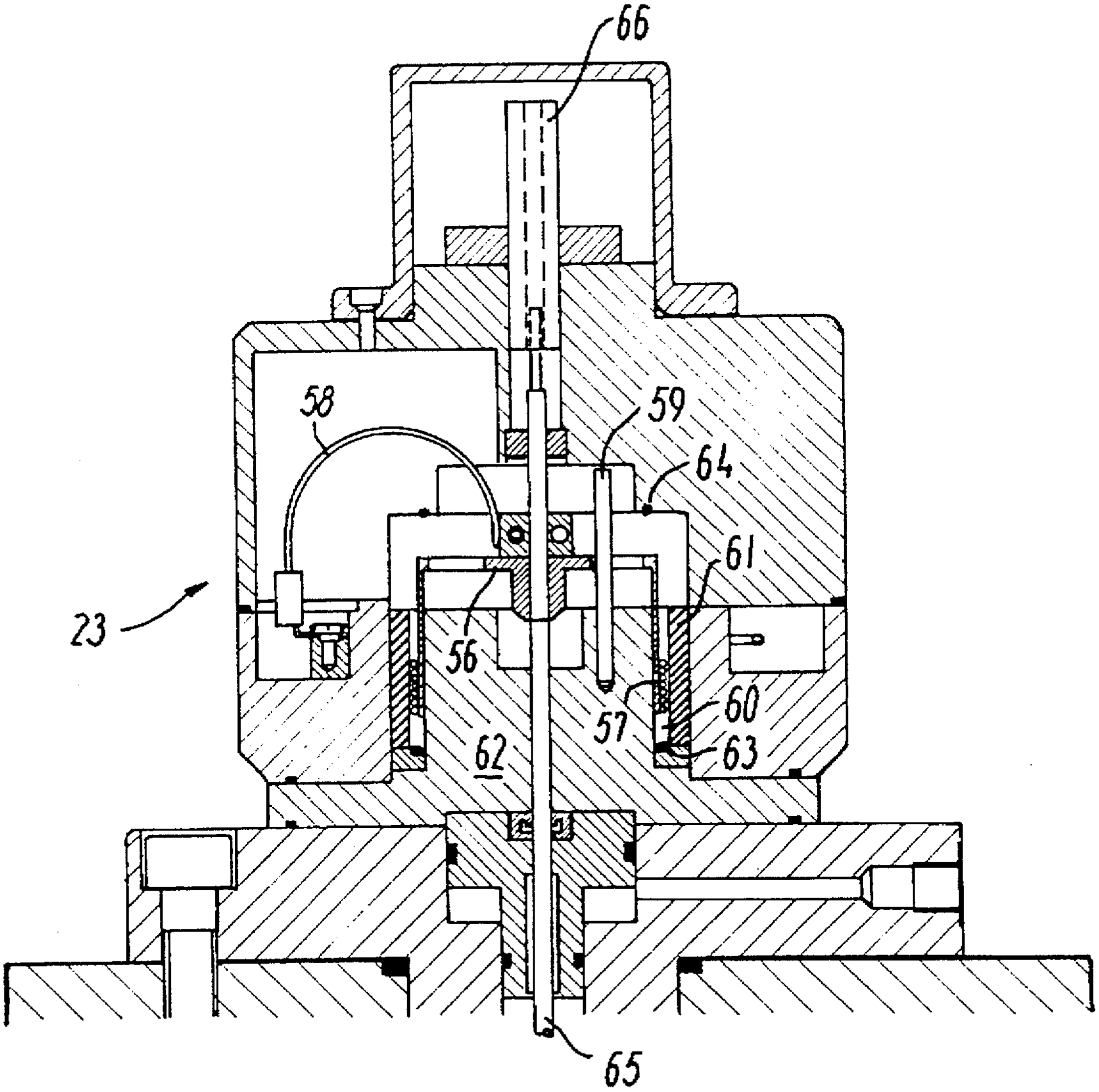

FIG. 3 shows that a transverse conduit 47 from each bore 46 opens out into a central longitudinal bore 48 in the spool. The bore 48 is through-going in the full length of the spool, and a small pilot spool 49 is inserted in the bore. Two circumferential grooves 50 and 51 have been so incorporated in the peripheral surface of the pilot spool that a flange 53 positioned centrally between the grooves has a width exactly corresponding to the width of the transverse conduits 47. The groove 50 communicates continuously with the inlet conduit 29 through a pressure conduit 54. Through a drain conduit 55, the groove 51 communicates continuously with the drain conduit 30. In the position shown, the pilot spool is in its neutral position, where the central flange 53 cuts off the transverse conduits 47 from connection with both the pressure conduit 29 and the drain conduit 30.

The electrically controlled positioning means 23 is designed according to the linear motor principle, where a movable part 56 carries several windings 57 connected with two U-shaped and therefore freely bendable wires 58, which are so flexible that they cannot prevent, delay or limit the setting movements of the movable part 56 in the longitudinal direction of the spool. The movable part 56 consists of an upper part positioned at right angles to the longitudinal direction of the spool and carrying an annular part projecting to one side, upon which the windings have been fastened, so that the planes of the individual windings are at substantially right angles to the longitudinal axis of the spool. Of course, other winding shapes may be used, but that would not give such a good effect of the current applied.

A control pin 59 projects through a hole in the movable part 56 and prevents the latter from rotating about the longitudinal axis of the spool. The annular section with the windings of the movable part protrudes down into an oblong slit 60, which is delimited outwards by a strong, annular magnet 61 and inwards by a cylinder-shaped iron-based core material 62. The narrow width of the oblong slit together with the strong magnet contributes to creating a strong magnetic field in the slit. The extent of the slit in the longitudinal direction of the spool is somewhat longer than the maximum setting length of the spool, but for the sake of safety, a soft rubber ring has been disposed at the bottom of the slit to damp the impact of the movable part against the bottom of the slit, in case the member is not stopped by the computer in time. A corresponding damping member 64 is found at the opposite limit stop for the movable part. The movable part is fixed on a connecting rod 65 to which the pilot spool is also fastened. On the side of the movable part 56 turning away from the pilot spool, the rod 65 continues into a position sensor 66 which supplies a continuous position signal to the computer via wires (not shown).

The computer continuously determines the intended position of the movable part 56 and thus of the pilot spool and of the spool, which, as explained below, sets itself all the time in the same position as the pilot spool. If the actual position measured by the sensor 66 differs from the intended position, the computer activates a current circuit supplying a current through the windings 57, where the direction and intensity of the current are adapted according to the difference between the actual and the intended positions. The current through the windings causes an electromagnetic force acting on the movable part for displacement in the longitudinal direction of the spool. When there is no current in the windings, the movable part is not affected by a position-changing resultant electromagnetic force.

Now, the functioning of the spool valve will be described. The computer continuously sets the movable part in the intended position. When the intended position has to be changed, the setting speed may be increased by the computer passing the current one way through the windings during the first half of the position change, and passing an equally large oppositely directed current through the windings during the second half of the position change, whereby the movable part is stopped in exactly the intended position. The setting speed may then be controlled by means of the current intensity. The setting of the spool takes place in the following manner. As mentioned, there is a continuous pressure in the bore 43, which yields a permanent force on the spool directed towards the end cover 26. When the pilot spool stands still it is possible that this force will displace the spool in the direction of the cover 26. If this happens, the transverse conduits 47 are put into communication with the pressure conduit 54, so that pressurized oil flows into the bores 46. The consequent pressure increase in the chamber in front of the piston members 45 acts on the spool with a force which is directed towards the cover 27 and forces the spool to occupy the position in which the central flange 53 of the pilot spool exactly bars the transverse conduits 47. If the pressure in the bores 46 becomes too great, the spool is moved a fraction towards the cover 26, thus putting the transverse conduits 47 into communication with the drain conduit 55, so that the overpressure in the bores 46 is relieved to the level of balance, where the oppositely directed forces on the spool have the same magnitude.

It is seen from this that the spool will always rapidly set itself in the position where the central flange 53 bars the transverse conduits 47. As the bores 46 have a larger diameter than the bores 43, there will always be a resulting force on the spool, if it does not occupy the above mentioned neutral position in relation to the pilot spool. When the pilot spool is displaced in the longitudinal direction of the spool by influences from the rod 65, the spool will immediately participate in this movement for the above reasons. The small mass of the pilot spool and the associated rod causes the setting forces on the spool to be extremely small, and makes the spool act very rapidly.

Through a rod 67, the piston 28 may be brought into connection with the pilot spool, if a failure of the electronic control occurs. Instead of a hydraulic transfer of the cam movement to the piston 28, the piston 28 may be omitted, and the rod 67 be designed so that it extends down to a control cam 70 on a camshaft positioned in alignment with the end cover 27. FIG. 1 schematically illustrates the cam 70.

The spool housing 24 may be designed with only one or with more than two outlet conduits 31 depending on the desired oil flow to the pressure chamber 32. The number of the other connections 29, 30 of the housing and the number of associated circumferential grooves in the housing and flanges on the spool are adapted to the number of outlet conduits.

We claim:

1. An internal combustion engine comprising; a crankshaft, engine cylinders and engine pistons positioned in said engine cylinders; hydraulically driven cylinder members at least one of said hydraulically driven cylinder members being mounted at least at one of said engine cylinders, a hydraulic drive of said cylinder member comprises a driving piston positioned in a hydraulic cylinder;

said hydraulic cylinder having a flow passage in communication with a spool valve, the spool of said spool valve adjustable in its longitudinal direction by means of a linear motor over a distance between extreme positions and can occupy one position in which the flow passage is connected with a high pressure source for hydraulic oil, and a second position, where the flow passage is connected with a low pressure port, said linear motor including a winding-carrying movable part which is displaceable in the longitudinal direction of the spool, said linear motor being electrically activated by an electronic control unit which can supply current having a direction and an intensity to the windings of said movable part, and which control unit determines how the cylinder member is to be activated during an engine cycle, and determines intended positions for the spool and the movable part, said movable part with windings being positioned in a magnetic field on oblong slit in the longitudinal direction of the spool, so that said movable part is displaceable in the longitudinal direction depending of the direction and intensity of said current in the windings, a sensor to signal the actual position of the movable part to the control unit, said movable part being connected with a small pilot spool which is displaceable with respect to the spool, with the spool following the movements of the pilot spool, said control unit supplies current to the winding if the actual position of the movable part differs from the intended position.

2. An internal combustion engine as claimed in claim 1, further comprising a fuel pump and wherein said hydraulic drive is said drive for a fuel pump.

3. An internal combustion engine as claimed in claim 1, wherein the engine is a main engine of a ship.

4. An internal combustion engine as claimed in claim 1, wherein the engine is a stationary power-producing engine.

5. An internal combustion engine as claimed in claim 1, wherein the slit is delimited by an annular magnet to one side and an iron-based material to another side.

6. An internal combustion engine as claimed in claim 1, wherein the movable part and the pilot spool are mounted on a first rod extending in said longitudinal direction and maintaining a fixed longitudinal spacing between the movable part and the pilot spool.

7. An internal combustion engine as claimed in claim 6, wherein the pilot spool is positioned inside the spool and has two circumferential grooves in its peripheral surface and a flange positioned between the grooves, and wherein the two grooves of the pilot spool communicate with the high pressure source and the low-pressure port, respectively.

8. An internal combustion engine as claimed in claim 7, wherein said spool has a first end with at least one axially extending bore communicating with the high-pressure source, and a second end with at least one axially extending bore which has a larger cross sectional area than the at least one bore at the first end of the spool, at least one first piston supported by the spool housing is displaceably mounted in the at least one bore at said first spool end, at least one second piston supported by the spool housing is displaceably mounted in the at least one bore at said second spool end, and wherein said at least one bore at the second spool end has a conduit which extends to a mouth which may be barred by the flange of the pilot spool.

9. An internal combustion engine as claimed in claim 6, wherein the pilot spool is positioned coaxially with the spool.

10. An internal combustion engine as claimed in claim 6, wherein in case of failure in the electronic activation of said linear motor the pilot spool may be activated via a second rod following the movements of a control cam rotating synchronously with the crankshaft of the engine.

11. An internal combustion engine as claimed in claim 10, wherein said second rod extends coaxially with the spool on the side of the pilot spool opposite to said first rod.

12. An internal combustion engine as claimed in claim 1, wherein the engine is a two-stroke crosshead type.

13. An internal combustion engine as claimed in claim 1, wherein said hydraulic drive is an exhaust valve.

14. A spool valve for a hydraulic drive having a flow passage, comprising;

a spool being displaceable in a longitudinal direction in a spool housing, which spool is adjustable in its longitudinal direction by means of a linear motor and can occupy one position in which the flow passage is connected with a high pressure source for hydraulic oil, and a second position, where the flow passage is connected with a low pressure port, said linear motor including a winding-carrying movable part which is displaceable in the longitudinal direction of the spool, said linear motor being electrically activated by an electronic control unit which can supply current having a direction and an intensity to the windings of said movable part, and which control unit determines intended positions for the spool and the movable part, said movable part with windings being positioned in a magnetic field so that said movable part is displaceable in the longitudinal direction depending of the direction and intensity of said current in the windings, a sensor to signal the actual position of the movable part to the control unit, a pilot spool mounted on a first rod extending in said longitudinal direction and maintaining a fixed longitudinal spacing between the pilot spool and said movable part, said pilot spool being positioned inside the spool and being displaceable with respect to the spool, with the spool following the movements of the pilot spool, said pilot spool having two circumferential grooves in its peripheral surface and a flange positioned between the grooves, said two grooves of the pilot spool communicating with the high pressure source and the low-pressure port, respectively, said spool having a first end with at least one axially extending bore communicating with the high-pressure source, and a second end with at least one axially extending bore which has a larger cross-sectional area than the at least one bore at the first end of the spool, at least one first piston which is supported by the spool housing and is displaceably mounted in the at least one bore at said first spool end, at least one second piston which is supported by the spool housing and is displaceably mounted in the at least one bore at said second spool end, said at least one bore at the second spool end having a conduit which extends to a mouth which may be barred by the flange of the pilot spool, said control unit supplies current to the winding if the actual position of the movable part differs from the intended position.

* * * * *